United States Patent [19]
Marks et al.

[11] Patent Number: 5,679,205
[45] Date of Patent: Oct. 21, 1997

[54] APPARATUS FOR SEVERING AND SHAPING A STRIP OF ELASTOMERIC MATERIAL

[75] Inventors: Patrick David Marks, Uniontown; Bryan John McCoy, Clinton, both of Ohio

[73] Assignee: The Goodyear Tire & Rubber Company, Akron, Ohio

[21] Appl. No.: 494,671

[22] Filed: Jun. 26, 1995

[51] Int. Cl.[6] ........................ B29D 30/30
[52] U.S. Cl. .............. 156/406.6; 156/134; 156/209; 156/229; 156/257; 156/304.5; 156/406.4; 156/535; 225/96
[58] Field of Search ............... 156/130, 123, 156/134, 405.1, 406.4, 406.6, 209, 157, 304.5, 304.1, 535, 229, 257; 225/2, 4, 96, 106; 264/160, 163, 151, 284; 83/175, 879, 875, 658, 883, 885, 861; 30/366, 358; 425/289, 299

[56] References Cited

U.S. PATENT DOCUMENTS

| | | | |
|---|---|---|---|
| 1,016,347 | 2/1912 | Matych | 83/883 |
| 1,676,883 | 7/1928 | Beaney . | |
| 2,042,829 | 3/1936 | Carlin | 164/48 |
| 2,420,525 | 5/1947 | Deloye | 164/68 |
| 2,429,944 | 10/1947 | Rayburn et al. | 164/68 |
| 2,733,766 | 2/1956 | Wikle | 164/34 |
| 3,359,773 | 12/1967 | Stuchbery | 83/879 |
| 3,448,594 | 6/1969 | Macon | 66/147 |
| 3,481,520 | 12/1969 | Pickering | 225/4 |
| 3,505,145 | 4/1970 | Martensson et al. | 156/265 |
| 3,595,724 | 7/1971 | Leblond | 156/405 |
| 3,613,490 | 10/1971 | Bredow | 83/132 |
| 3,666,151 | 5/1972 | Dyer et al. | 225/96 |
| 3,809,306 | 5/1974 | Muhlbach et al. | 228/100 |
| 3,874,974 | 4/1975 | Simmons, Jr. | 156/405 |
| 3,922,939 | 12/1975 | Schlueter et al. | 83/299 |
| 3,933,565 | 1/1976 | Printz et al. | 156/304.5 |
| 3,972,214 | 8/1976 | Jagersberger | 72/132 |
| 4,009,237 | 2/1977 | Kimura et al. | 264/46.3 |
| 4,069,727 | 1/1978 | Sparks et al. | 83/16 |
| 4,279,183 | 7/1981 | LaFleur | 83/16 |
| 4,371,410 | 2/1983 | Stevens | 156/117 |
| 4,426,901 | 1/1984 | Hogan et al. | 83/861 |
| 4,465,536 | 8/1984 | Makino et al. | 156/133 |
| 4,516,451 | 5/1985 | Takeshita et al. | 83/171 |
| 4,596,617 | 6/1986 | Ishii | 156/150.3 |
| 4,738,743 | 4/1988 | Satoh et al. | 156/405.1 |
| 4,874,443 | 10/1989 | Kipling | 156/64 |
| 5,021,116 | 6/1991 | Tokita | 156/406.6 |
| 5,293,795 | 3/1994 | Osawa et al. | 83/16 |
| 5,379,667 | 1/1995 | Lauber | 83/16 |

FOREIGN PATENT DOCUMENTS

| | | |
|---|---|---|
| 0493062A1 | 12/1991 | European Pat. Off. . |
| 59-55734 | 3/1984 | Japan . |
| 2-22040 | 1/1990 | Japan .................. 156/406.4 |

*Primary Examiner*—Geoffrey L. Knable
*Attorney, Agent, or Firm*—Frederick K. Lacher

[57] ABSTRACT

A tire liner applier and method wherein a die and anvil shape the ends of the liner at a predetermined section which is transferred to a position adjacent the tire building drum where the section is stretched and the trailing end stitched against the drum. The leading end is clamped and applied to the drum where the next tire is built. The leading end and trailing end are tapered so that they slope away from the drum and provide a smooth transition where the ends contact the drum and outer layer of liner material. A butt splice may also be provided.

15 Claims, 4 Drawing Sheets

APPARATUS FOR SEVERING AND SHAPING A STRIP OF ELASTOMERIC MATERIAL

BACKGROUND OF THE INVENTION

This invention relates to preparing and applying tire components to a tire building drum and especially to applying liners and shaping the ends of the liners so that air and bladder release agents will not be trapped in the built tire during cure.

Heretofore liners have been applied to a tire building drum by a liner applier which positions the leading edge on the drum and then guides the liners as they are wrapped on the drum. The liners have been stitched by a stitcher roll to remove air from the space at the ends of the liners however this has been difficult because the cut leading and trailing ends of the liner have had square edges. The square edges are not desirable because they provide a space in the tire if they are not stitched to a smooth surface and also may create a visible seam at the inside of the tire.

Attempts to solve this problem have been made by crushing a liner of elastomeric material with heated rollers or dies to taper the edges of the liner as it is cut or before it is severed by stretching the liner beyond the elastic limit of the material. This crushing has provided tapered edges however, one of the edges has been tapered in a direction resulting in an edge which is difficult to stitch against a surface of the wrapped tire component so as to eliminate any space for trapped air. There has also been a problem controlling the stretching of the liner and transferring the loose cut section to the tire building drum.

SUMMARY OF THE INVENTION

The present invention is directed to an applier which shapes the ends of the liner with a die moveable into engagement with the liner at a predetermined location on the applier which is in the proximity of the tire building drum. The liner is heated, compressed and shaped by the movement of the die against a supporting belt and lower anvil plate. This results in a section of reduced thickness which is moved on the belt to an applier roll for laying a leading edge of the liner on the tire building drum. After the drum has rotated a predetermined amount, the rotation is stopped and the liner is clamped to the applier roll and held against the drum at both sides of the section of reduced thickness so that when the drum is rotated and the applier roll is retracted, the liner will be severed and the trailing edge stitched to the drum. The leading edge is then held against the applier roll for application to the drum during the building of the next tire.

A moveable die and support anvil on the applier are shaped so as to form the compressed section of the liner with tapered leading and trailing edges. The edges are tapered in opposite directions to provide smooth tapered joints with other portions of the liner over which it is wrapped. With the die and anvil of this invention, the tapered edges eliminate the problem of trapping air or other materials such as bladder release agent spray in the built tire. Also the seam at the end of the liner is not visible at the inside of the tire.

In accordance with one aspect of the invention, there is provided apparatus for shaping an end portion of a strip of elastomeric material and then severing the end portion comprising:

(a) a support anvil for supporting the strip having a generally flat first anvil support surface, a sloping anvil shaping surface and a generally flat second anvil support surface;

(b) a die member movable towards the strip on the support anvil having a sloping die shaping surface and a generally flat die support surface;

(c) the first anvil support surface intersecting the sloping anvil shaping surface at an anvil thinning edge;

(d) the sloping die shaping surface intersecting the die support surface at a die thinning edge;

(e) means to move the die member towards the anvil for compressing the end portion between the anvil thinning edge and the die thinning edge to decrease the thickness of the strip of elastomeric material while shaping the ends of the strip at each side of the die thinning edge and the anvil thinning edge; and, (f) means for stretching the strip of elastomeric material to sever the strip where the thickness is decreased by the anvil thinning edge and the die thinning edge.

In accordance with another aspect of the invention, there is provided a method of shaping and severing an end portion of a strip of elastomeric material to provide tapered trailing and leading edges comprising:

(a) compressing the end portion between an anvil and heated die member having sloping, shaping and supporting surfaces intersecting at thinning edges;

(b) conveying the shaped end portion to a position spaced from the anvil and die member;

(c) clamping the strip of elastomeric material at a leading edge side of the end portion;

(d) pulling the strip at the trailing edge side of the end portion to sever the strip whereby the leading edge and the trailing edge are tapered.

DESCRIPTION OF THE PREFERRED EMBODIMENTS

Figure 1:
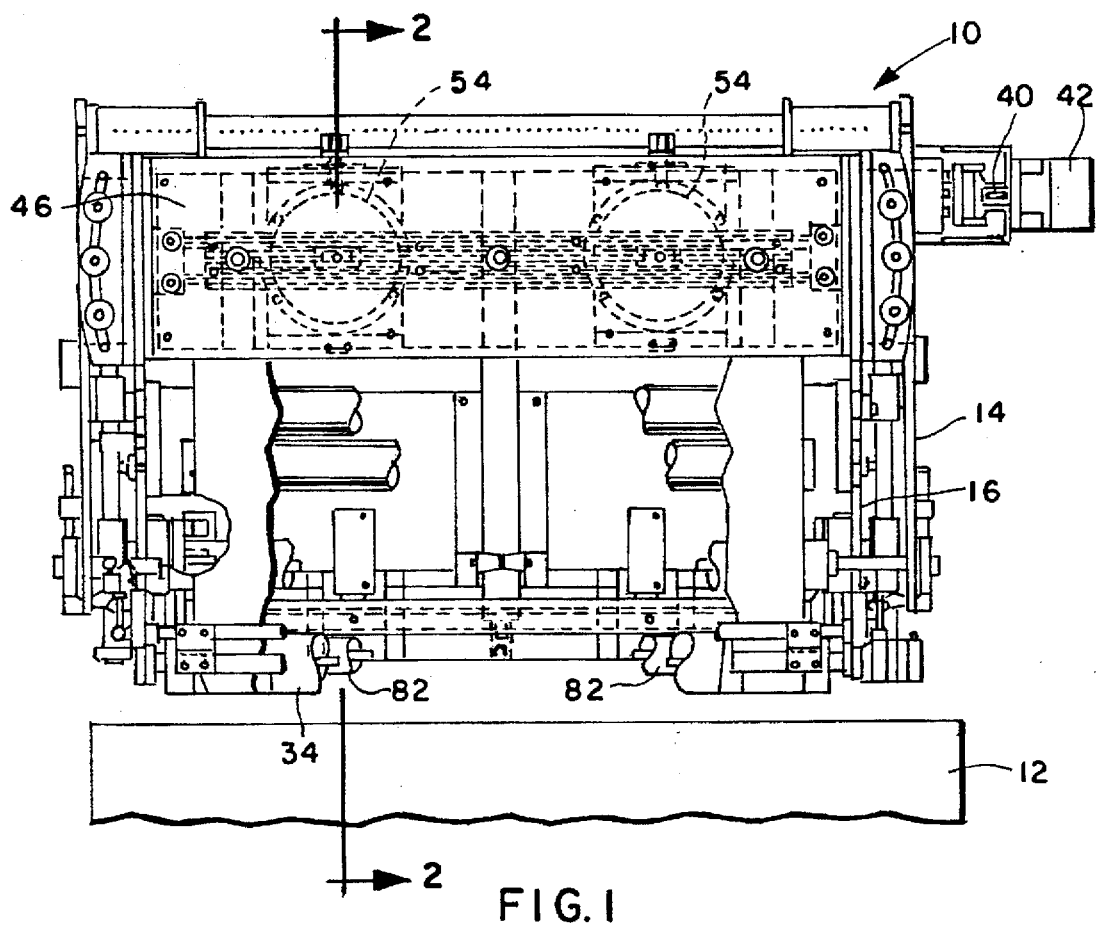
FIG. 1 is a plan view of the liner applier embodying the invention and the drum with parts broken away showing the relationship of the liner applier to the drum.
Figure 2:
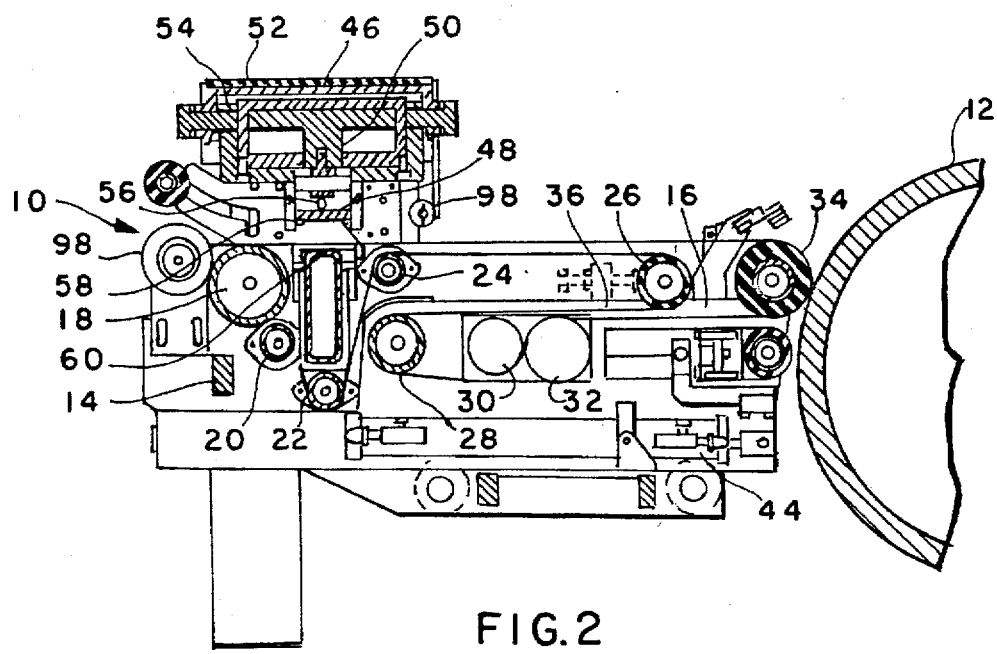
FIG. 2 is a cross section taken along line 2—2 of FIG. 1.
Figure 3:
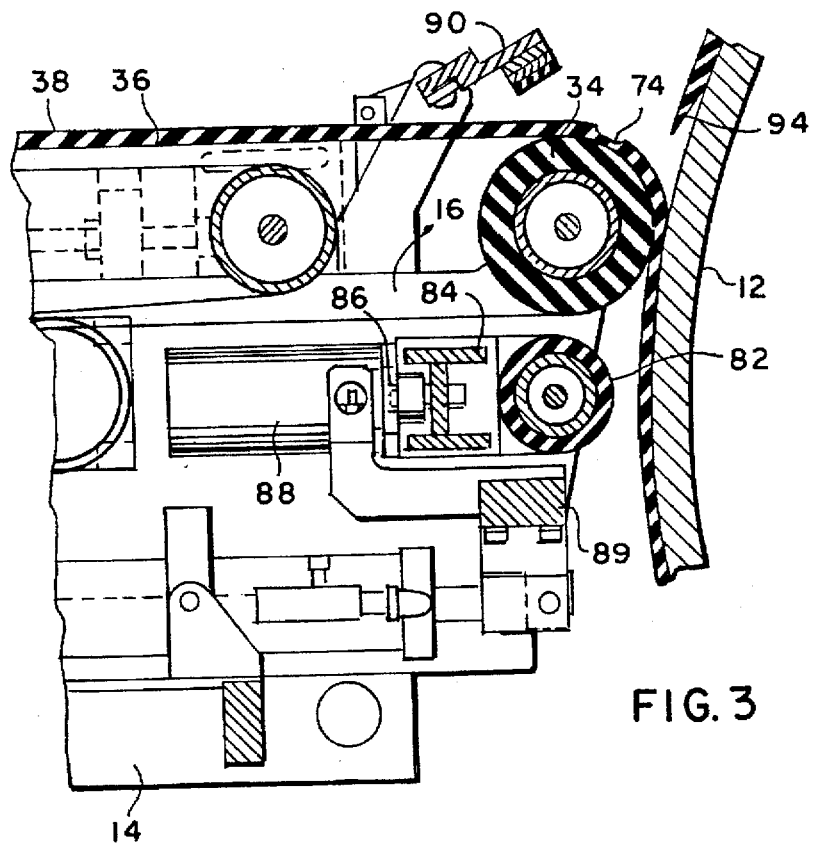
FIG. 3 is a enlarged fragmentary view like FIG. 2 of the end of the liner applier showing the liner being applied to the drum.
Figure 4:
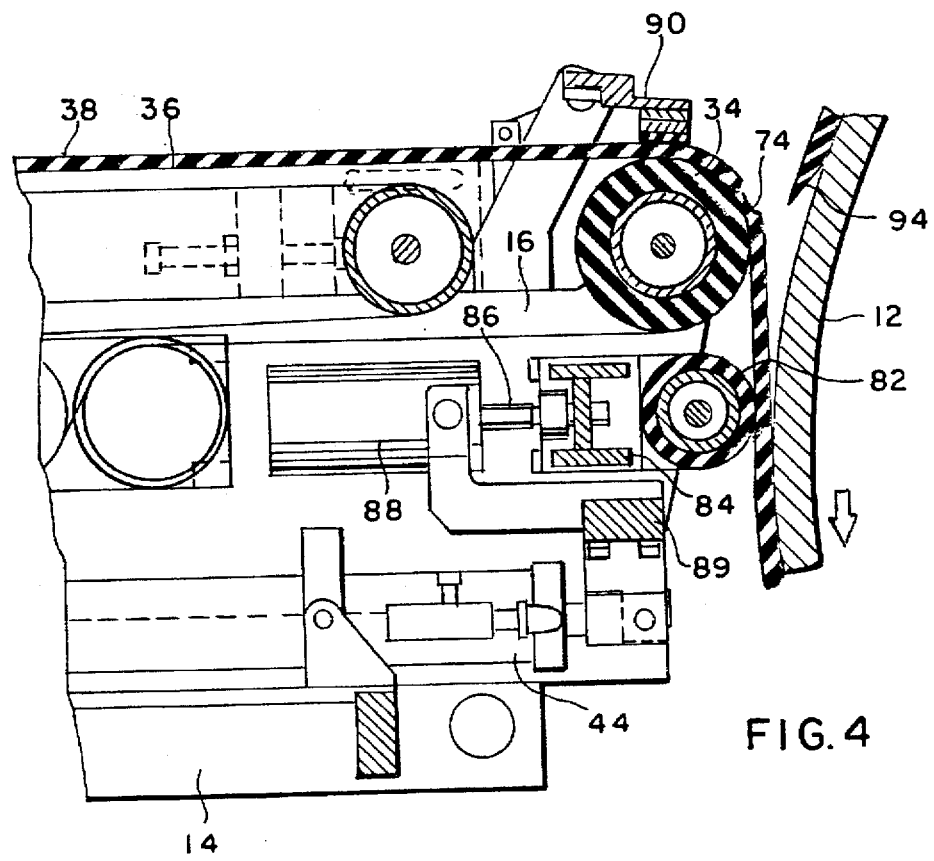
FIG. 4 is a view like FIG. 3 showing the liner being clamped to the applier roll so that the liner can be stretched by rotation of the drum and severed at the shaped end section.

Referring to FIGS. 1 and 2 a liner applier 10 is shown in relation to a tire building drum 12 The liner applier 10 has a main frame 14 and a subframe 16 which is movable toward and away from the surface of the drum 12 as shown in FIG. 3 and 4. Rolls 18, 20, 22, 24, and 26 are mounted on the main frame and rolls 28, 30, 32, and applier roll 34 are mounted on the subframe 16. A flexible belt 36 which may be of fabric coated with a 30 release material such as silicone is positioned around the rolls 18 through 34 for conveying the liner (not shown in FIGS. 1 and 2). A liner 38 is shown in FIGS. 3 and 4 and is carried across the main frame 14 to the applier roll 34 on the sub frame 16. The flexible belt 36 is driven by roll 18 on the main frame 14 which has a driving connection with a shaft 40 of a suitable power supply such as a motor 42.

A piston cylinder assembly 44 mounted on the main frame 14 is connected to the subframe 16 for moving the sub frame from the retracted position shown in FIGS. 2 and 4 to the extended position shown in FIG. 3.

Referring to FIGS. 1 and 2, a liner shaping and compressing assembly 46 is shown having an upper removable die supporting plate 48 connected to a pair of piston rods 50 of pistons 52 and pair of cylinders 54 mounted on the main frame 14.

In shaping the liner the pressure applied by the die member 58 against the anvil member 60 by the two pistons 52 and cylinders 54 is preferably around 10,000 lbs. It is also important to provide a coating of a suitable release material on the belt 36 which may be of silicone. It is also important to provide coating of the anvil member 60 with a suitable release material such as silicone.

Fastened on the die supporting plate 48 is a heating member 56 and a die member 58 for movement downward towards the belt 36 on which a liner 38 may be supported. During the shaping of the liner 38 the temperature of the die member 58 is preferably between 210°–230° F. (99°–110° C.).

Referring to FIG. 1 and 2, an air bar 98 is shown positioned adjacent the die member 58 for the purpose of blowing a pulse of air against the liner interface to assure complete separation of the liner 38 from the die member after completing the shaping.

Figure 5A:
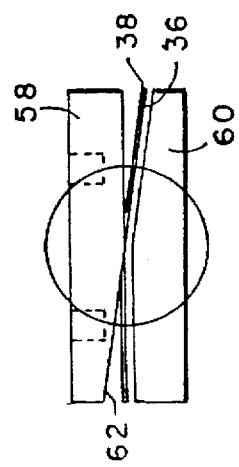
FIG. 5A is an enlarged view of the support anvil and movable die member showing the liner and supporting belt being compressed to provide the desired tapered ends of the liner.
Figure 5B:
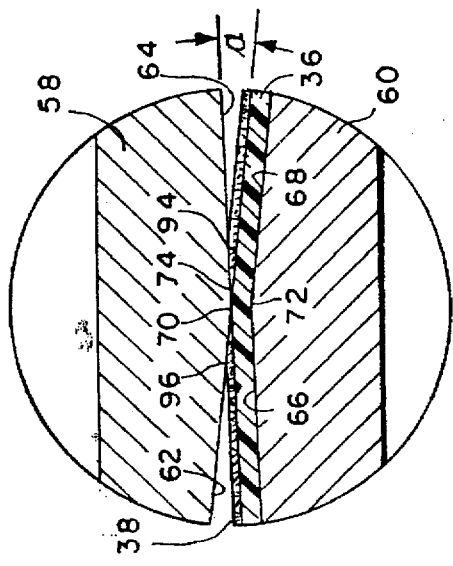
FIG. 5B is an enlarged view of the compression surfaces shown in FIG. 5A with the shaped liner edges.

Referring to FIGS. 5A and 5B, the die member 58 and anvil member 60 are shown in greater detail in the position where they are squeezing the liner 38 between the shaping surfaces. In the embodiment of FIG. 5A and 5B the upper die member 58 has a sloping die shaping surface 62 and a flat die support surface 64 generally parallel to the path the belt 36 moves across the applier 10. The anvil 60 has a flat first anvil support surface 66 and a sloping anvil shaping surface 68. The sloping die shaping surface 62 and flat die support surface 64 intersect at a die thinning edge 70 while the anvil flat support 66 and sloping support surface 68 intersect at an anvil thinning edge 72. The die member 58 and anvil member 60 are aligned so that the die thinning edge 70 and the anvil thinning edge 72 are in alignment for creating a thin strip 74 between the edges of the liner 38. The sloping angle "a" at which the edges of the liner 38 are shaped preferably is between 5° and 10°.

Figure 6A:
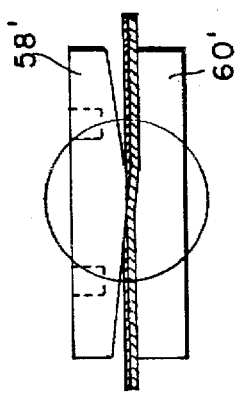
FIG. 6A is a view like FIG. 5A of a modified die and anvil showing different die shaping surfaces and anvil shaping surfaces.
Figure 6B:
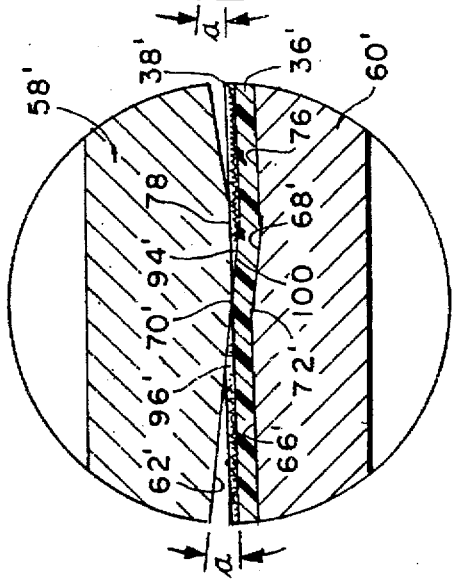
FIG. 6B is an enlarged view of the die member and anvil member shown in FIG. 6A.

Referring to FIG. 6A and 6B a modification is shown in which the die member and anvil member as well as those parts which are the same as those shown in FIGS. 5A and 5B are identified with an apostrophe. The difference is that the anvil member 60' has a second flat surface 76. Also the die member 58' has a flat surface 78.

Figure 7A:
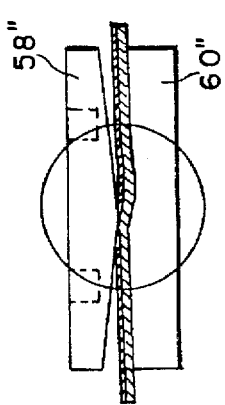
FIG. 7A is a view like FIG. 5A of a further modification showing the upper die and lower anvil with other different die shaping surfaces and anvil shaping surfaces.
Figure 7B:
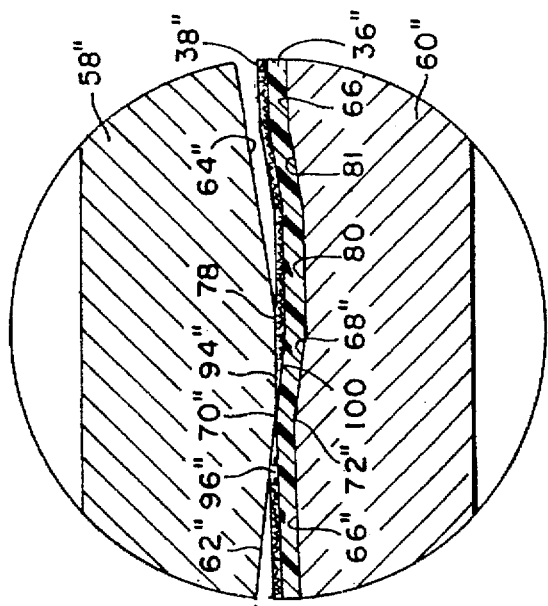

Referring to FIGS. 7A and 7B, the anvil die modification shown has parts which are the same as those in FIG. 5B and these are identified with the same numerals and a quotation mark.

The anvil 60" has a second flat surface 80 between the sloping surface 68" and a second sloping surface 81. This returns the belt 36" and liner 38" to the plane of the first flat surface 66".

Referring to FIG. 3, the liner 38 is shown after the flexible belt 36 is advanced to carry the thin section 74 to a position at the surface of the applier roll 34. A stitcher roll 82 is mounted on brackets supported on a bar 84 connected to piston rods 86 of piston cylinder assemblies 88 mounted on the sub frame 16 by a bar 89. By actuating the piston cylinder assemblies 88 the stitcher roll 82 may be moved towards the drum 12. When the thin section 74 has reached a point adjacent the drum 12 as shown in FIG. 3 the sub frame 16 and applier roll 34 may be moved away from the drum by moving and the stitcher roll 82 towards the drum as shown in FIG. 4. At the same time clamp 90 mounted on the sub frame 16 is actuated to clamp the liner 38 against the applier roll 34. Then upon movement of the drum 12 in the direction of the arrow as shown in FIG. 4 the thin section 74 will be stretched and sever the liner precisely along the thin section where it had previously been shaped by the squeezing between the anvil 60 and die member 58.

Figure 9:
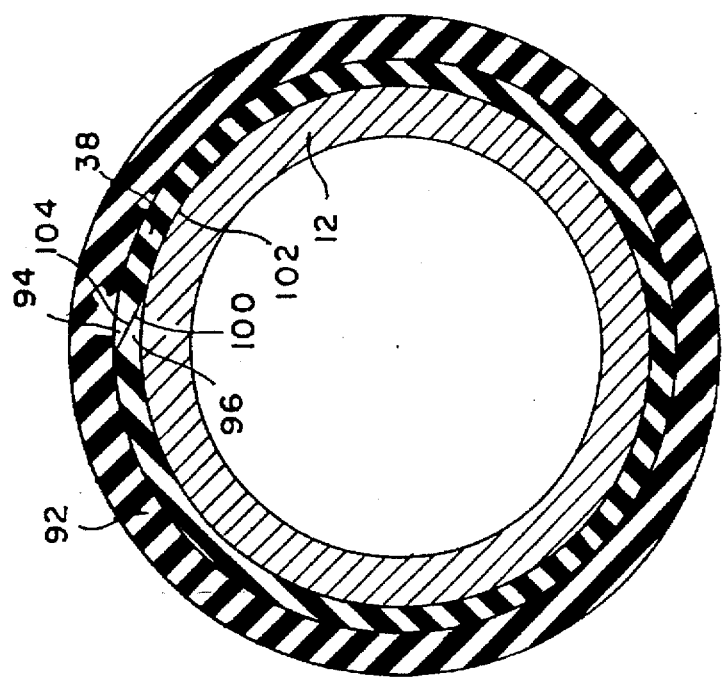
FIG. 9 is a view like FIG. 8 showing a butt splice of the end surfaces shaped by the shaping surfaces shown in FIG. 6B and FIG. 7B.
Figure 8:
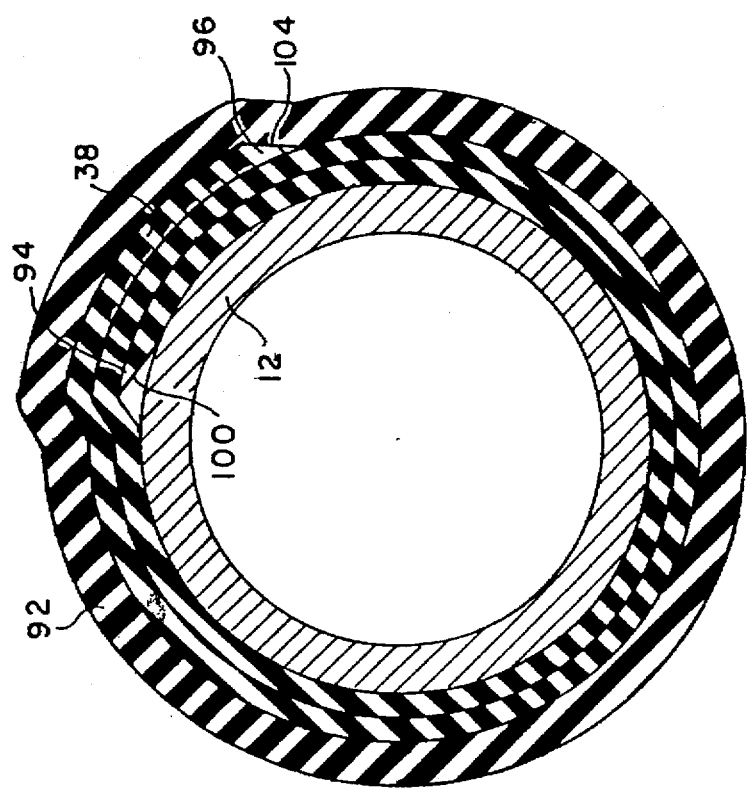
FIG. 8 is a schematic view showing the tire building drum with the liner wrapped around the drum and a barrier member wrapped around the liner to illustrate the advantages of the shaped ends provided by the shaping surfaces of the die member and anvil shown in FIG. 6B and FIG. 7B.

Referring to FIGS. 8 and 9, a schematic showing is made of the liner 38 wrapped on the drum 12. A barrier layer 92 is wrapped around the liner 38. In FIG. 8 the liner 38 is wrapped around the drum 12 several times and as shown a leading end 94 is sloped away from the drum as is the trailing end 96 to provide a smooth transition where the ends contact the drum and the outer layer of liner material.

With reference to FIG. 9, a construction is shown in which the leading end 94 is butt spliced with the trailing end 96. In addition to providing a smooth joint at the inside of the tire the splice also provides a smooth joint with the barrier 92 and decreases the possibility of trapping air or other unwanted materials at this joint.

Figure 10:
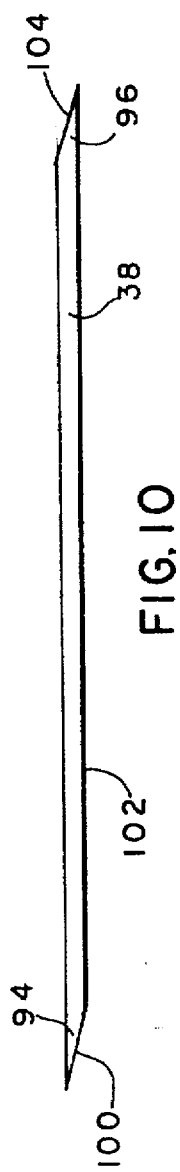
FIG. 10 is a side view of a liner with the tapered ends shaped by the die and anvil members shown in FIGS. 6B and 7B.

The liner 38 shown in FIG. 10 has the tapered leading end 94 and tapered trailing end 96 formed by the die members 58',58", and anvil members 60',60" in FIGS. 6B and 7B. The leading end 94 has a tapered surface 100 sloping outward from the drum facing surface 102. This tapered surface 100 is formed by the sloping anvil supporting surface 68', 68" and the die flat surface 78. The trailing end 96 has a tapered surface 104 sloping in the same direction as the tapered surface 100 of the leading end 94. This tapered surface 104 is formed by the flat anvil supporting surface 66', 66" and the sloping die support surface 62', 62".

While certain representative embodiments and details have been shown for the purpose of illustrating the invention, it will be apparent to those skilled in the art that various changes and modifications may be made therein without departing from the spirit or scope of the invention.

What is claimed is:

1. Apparatus for shaping an end portion of an associated strip of elastomeric material and then severing said end portion comprising:

a support anvil for supporting said associated strip having a first anvil support surface disposed in a first plane, an anvil shaping surface disposed in a second plane sloped at a first angle to said first anvil support surface, an anvil thinning edge located at an intersection of said first anvil support surface and said anvil shaping surface, and a planar second anvil support surface intersecting said anvil shaping surface at a position spaced from said anvil thinning edge and being substantially parallel to said first anvil support surface;

a die member having a die shaping surface, a die support surface and a die thinning edge located at an intersection of said die shaping surface and said die support surface;

first moving means for selectively moving said die member toward said anvil to place said die shaping surface substantially in said second plane for compressing said end portion of said associated strip between said anvil thinning edge and said die thinning edge to decrease the thickness of said associated strip, said die member and said anvil cooperating to shape said associated strip of elastomeric material at each side of said die thinning edge and said anvil thinning edge to provide end surfaces which are matched for splicing after severance of said associated strip; and, stretching means for stretching said associated strip of elastomeric material, said associated strip being severed where the thickness is decreased by said anvil thinning edge and said die thinning edge.

2. Apparatus in accordance with claim 1 wherein said support anvil further includes:

a third anvil support surface intersecting said second anvil support surface at a second angle; and, a planar fourth anvil support surface disposed in said first plane and intersecting said third anvil support surface.

3. Apparatus in accordance with claim 1 including a heater for heating said die member to a temperature of 210°–230° F.(99°–110° C.).

4. Apparatus in accordance with claim 1 wherein said first angle is between 8 and 20 degrees.

5. Apparatus in accordance with claim 1 including a flexible belt extending between said support anvil and said die member for conveying said end portion of said associated strip of elastomeric material from a position between said support anvil and said die member to a position adjacent an associated tire building drum where said end portion of said strip of elastomeric material is severed by said means for stretching.

6. Apparatus in accordance with claim 5 wherein said flexible belt is coated with a release material for separating said elastomeric material from said belt.

7. Apparatus in accordance with claim 6 wherein said release material contains silicone.

8. Apparatus in accordance with claim 5 including an air bar positioned adjacent said die member for communicating air under pressure to a space between said die member and said associated strip of elastomeric material after shaping of said end portion to separate said strip from said die member.

9. Apparatus in accordance with claim 5 further comprising:

a main frame supporting said belt;

conveyor rolls mounted on said main frame and positioned at either side of said anvil; and, a drive roller mounted on said main frame in operative engagement with said belt.

10. Apparatus in accordance with claim 9 further comprising:

a subframe slidably mounted on said main frame;

second moving means for selectively moving said subframe between a retracted position and an extended position;

an applier roll for urging said associated elastomeric strip into engagement with said associated tire building drum, said applier roll being mounted on said subframe and moveable therewith and being spaced from said associated tire building drum when said subframe is in said retracted position and being adjacent said associated tire building drum when said subframe is in said extended position.

11. Apparatus in accordance with claim 10 further comprising:

a stitcher roll mounted on said subframe; and, third moving means for selectively moving said stitcher roll from a position spaced from said associated tire building drum to a position adjacent said associated tire building drum, said stitcher roll holding said associated elastomeric strip in engagement with said associated tire building drum when said stitcher roll is in said adjacent position.

12. Apparatus in accordance with claim 10 wherein said stretching means comprises:

clamping means for clamping said associated strip of elastomeric material at said applier roll, said clamping means being mounted on said subframe and moveable between a non-engaging position and an engaging position.

13. Apparatus in accordance with claim 10 wherein said second moving means includes air cylinder and piston means.

14. Apparatus in accordance with claim 1 wherein said die member is coated with a material containing a release agent for separating said elastomeric material from said die member after compression of said end portion between said anvil thinning edge and said die thinning edge.

15. Apparatus in accordance with claim 1 wherein said first moving means includes means to exert 10,000 pounds of force by said die member against said support anvil.

* * * * *